United States Patent [19]

Hamada et al.

[11] Patent Number: 5,543,467
[45] Date of Patent: Aug. 6, 1996

[54] GOLF BALL

[75] Inventors: Akihiko Hamada, Kakogawa; Yoshikazu Yubuki, Akashi; Akira Kato, Kobe, all of Japan

[73] Assignee: Sumitomo Rubber Industries, Ltd., Hyogo-ken, Japan

[21] Appl. No.: 267,518

[22] Filed: Jun. 29, 1994

[30] Foreign Application Priority Data

Jul. 2, 1993 [JP] Japan .................................. 5-190736

[51] Int. Cl.$^6$ ............................. C08L 33/02; C08L 23/26; A63B 37/12
[52] U.S. Cl. ..................... 525/207; 473/385; 525/196; 525/208; 525/221
[58] Field of Search ........................ 525/74, 196, 207; 273/235 R

[56]  References Cited

U.S. PATENT DOCUMENTS

| | | |
|---|---|---|
| 3,852,236 | 12/1974 | Heilman . |
| 4,855,363 | 8/1989 | Moteki . |
| 4,898,911 | 2/1990 | Miyashita et al. . |
| 4,968,752 | 11/1990 | Kawamoto . |
| 5,098,105 | 3/1992 | Sullivan . |
| 5,359,000 | 10/1994 | Hamada et al. . |

FOREIGN PATENT DOCUMENTS

| | | |
|---|---|---|
| 61-238846 | 10/1986 | Japan . |
| 2-202530 | 8/1990 | Japan . |
| 2197654 | 5/1988 | United Kingdom . |

*Primary Examiner*—Carman J. Seccuro, Jr.
*Attorney, Agent, or Firm*—Birch, Stewart, Kolasch & Birch, LLP

[57] ABSTRACT

A golf ball having excellent hit feeling, control properties and flying performance. The golf ball has a core and a cover covering the core, and the base material of the cover comprises a heated mixture of an ionomer resin, a maleic anhydride-modified olefinic copolymer and a glycidyl group-containing olefinic copolymer.

4 Claims, No Drawings

GOLF BALL

FIELD OF THE INVENTION

The present invention relates to a golf ball. More particularly, it relates to a golf ball having excellent hit feeling, control properties and flying performance.

Recently, an ionomer resin has been used widely as a base resin for the cover of a golf ball (e.g. Japanese Laid-Open Patent Publication No. 49-49727). Particularly, the ionomer resin is exclusively used for the cover of a two-piece golf ball.

This is because the ionomer resin is superior in durability, cut resistance and impact resilience and further, it is easily processed and inexpensive in comparison with other base resins used for the cover.

However, the ionomer resin is inferior in hit feeling and control properties (ease of giving spin on the ball) in comparison with balata (transpolyisoprene) used as the base resin for the cover of a thread wound golf ball, because the ionomer resin has considerably high hardness and stiffness.

Therefore, Japanese Laid-Open Patent Publication No. 1-308577 suggests a soft ionomer resin comprising a sodium or zinc salt of a terpolymer of an olefin having 2 to 8 carbon atoms, an unsaturated monocarboxylic acid having 3 to 8 carbon atoms and an unsaturated monomer having 2 to 22 carbon atoms such as acrylate.

When using the soft ionomer resin, hit feeling and control properties are improved, however, flying performance and cut resistance are deteriorated and, therefore, a golf gall having satisfactory performances can not be obtained.

In addition to the above suggestion, various trials of softening the ionomer resin to improve hit feeling and control properties have been made. However, satisfactory results have still not been obtained.

As described above, the ionomer is inferior in hit feeling and control properties in comparison with balata used in the thread wound golf ball since the ionomer resin has high hardness and stiffness. Further, the attempt to soften the ionomer resin to improve hit feeling and control properties has not been successful.

SUMMARY OF THE INVENTION

Under these circumstances, in order to satisfy both hit feeling and flying performance, the present inventors have intensively studied the base resin used for the cover. As a result, it has been found that, by using as the base material for the cover a resin mixture obtained by formulating a maleic anhydride-modified olefinic copolymer as a soft resin component and a glycidyl group-containing olefinic copolymer having reactivity with other components in an ionomer resin and mixing them with heating, a golf ball having excellent hit feeling, control properties, flying performance and cut resistance can be obtained. Thus, the present invention has been completed.

The main object of the present invention is to provide a golf ball having excellent hit feeling, control properties and flying performance.

These objects as well as other objects and advantages of the present invention will become apparent to those skilled in the art from the following description.

The present invention provides a golf ball having a core and a cover covering the core, the base material of said cover comprising a heated mixture of an ionomer resin, a maleic anhydride-modified olefinic copolymer and a glycidyl group-containing olefinic copolymer.

DETAILED DESCRIPTION OF THE INVENTION

In the present invention, since the maleic anhydride-modified olefinic copolymer as the soft resin component is formulated in the ionomer resin, the ionomer resin is softened, which results in improved hit feeling and control properties.

Furthermore, since the glycidyl group-containing olefinic copolymer is further formulated in the ionomer resin in addition to the maleic anhydride-modified olefinic copolymer and they are mixed with heating, the glycidyl group is reacted with the free carboxyl group in the ionomer resin and the maleic anhydride in the maleic anhydride-modified olefinic copolymer. Therefore, a uniform dispersion of the anhydride-modified olefinic copolymer as the soft resin into the ionomer resin as well as an improvement of the impact resilience are accomplished so that a deterioration of the excellent flying performance (impact resilience) and cut resistance of the ionomer resin is inhibited.

In the present invention, as the ionomer resin used as the constituent component of the base material for the cover, for example, there is provided a resin wherein a part of the carboxyl group of the copolymer comprising 10 to 20% by weight of $\alpha$, $\beta$-unsaturated carboxylic acid having 3 to 8 carbon atoms and 80 to 90% by weight of $\alpha$-olefin is neutralized with a metal ion (e.g. metal ion of Na, Li, Zn, Mg, etc.). Examples thereof include various types of ionomer resins commercially available from Du Pont Co. under the trade name of Surlyn and various type ionomer resins commercially available from Mitsui Du Pont Polychemical Co., Ltd. under the trade name of Himilan.

In the present invention, the maleic anhydride-modified olefinic copolymer and the glycidyl group-containing olefinic copolymer are used as the constituent component of the base material for the cover, in addition to the ionomer resin. Both of them contain an olefin component as a requisite copolymerization component in addition to the other reactive component, taking compatibility with the ionomer resin into consideration.

As the olefin component of the maleic anhydride-modified olefinic copolymer, those having 2 to 8 carbon atoms are preferred. Examples thereof include ethylene, propylene, 1-butene, isobutylene, 1-pentene, 1-octene and the like. Particularly, ethylene and propylene are preferred.

Further, the copolymerization component may be formulated in the maleic anhydride-modified olefinic copolymer in addition to maleic anhydride or olefin for the purpose of softening. Examples of the copolymerization component include acrylates such as methyl acrylate, ethyl acrylate, butyl acrylate, etc.; methacrylates such as methyl methacrylate, ethyl methacrylate, butyl methacrylate, etc.; vinyl acetate, etc. In view of compatibility with the ionomer resin, acrylates and methacrylates are preferred.

Examples of the maleic anhydride-modified olefinic copolymer include various grades of ethylene-ethyl acrylate-maleic anhydride terpolymers commercially available from Sumitomo Chemical Co., Ltd. under the trade name of "Bondine". They are suitably used in the present invention.

The maleic anhydride-modified olefinic copolymer is formulated for the purpose of softening the ionomer resin. Therefore, it is desired that the stiffness thereof is low in comparison with that of the normal ionomer resin (e.g. 2,500 to 3,500 kgf/cm$^2$). The stiffness is preferably in a range from about 10 to 1,000 kgf/cm$^2$.

As the olefin component of the glycidyl group-containing olefinic copolymer, there can be employed the same olefins as those of the maleic anhydride-modified olefinic copolymer. It is particularly preferred to use ethylene. The following glycidyl group components are preferred in view of copolymerizability with olefins.

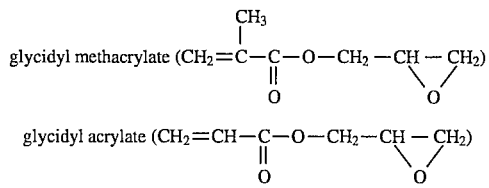

Further, in order to adjust hardness or melt index, copolymerization components such as acrylates, methacrylates, vinyl acetate, etc. may be formulated in the glycidyl group-containing olefinic copolymer, in addition to the glycidyl group components and olefin components.

Examples of the glycidyl group-containing olefinic copolymer include ethylene-glycidyl methacrylate copolymer, ethylene-glycidyl methacrylate-methyl acrylate terpolymer and ethylene-glycidyl methacrylate-vinyl acetate terpolymer which are commercially available from Sumitomo Chemical Co., Ltd. under the trade name of "Bondfast". They can be suitably used in the present invention.

The preferred amount of the above three kinds of the resin (i.e. ionomer resin, maleic anhydride-modified olefinic copolymer and glycidyl group-containing olefinic copolymer) is 30 to 85% by weight, 10 to 69.8% by weight and 0.2 to 5% by weight, respectively.

When the amount of the ionomer resin is smaller than 30% by weight, flying performance and cut resistance are deteriorated. On the other hand, when the amount of the ionomer resin is larger than 85% by weight, sufficient softening cannot be accomplished to come out properties of the ionomer resin strongly, which results in deterioration of hit feeling and control properties.

When the amount of the maleic anhydride-modified olefinic copolymer is smaller than 10% by weight, sufficient softening of the ionomer resin can not be accomplished and, therefore, hit feeling and control properties cannot be improved. On the other hand, when the amount of the maleic anhydride-modified olefinic copolymer is larger than 69.8% by weight, cut resistance is deteriorated and, therefore, satisfactory golf ball cannot be obtained.

When the amount of the glycidyl group-containing olefinic copolymer is smaller than 0.2% by weight, impact resilience is not sufficiently improved. On the other hand, when the amount of the glycidyl group-containing olefinic copolymer is larger than 5% by weight, fluidity of the resin is deteriorated by the excess reaction, which results in hindrance to molding of the cover.

In the present invention, desired properties can be obtained by mixing the above three kinds of resins with heating. The mixing with heating is normally conducted by treating them under the conditions of a temperature of 150° to 250° C. and a treating time of 0.5 to 15 minutes using an internal mixer such as kneading type twin-screw extruder, Banbury, kneader, etc.

The very small amount of a water content in the resin is normally enough for the reaction between the maleic anhydride and the glycidyl group. If necessary, about 0.1 to 0.2% by weight of the water content may be added to mix resins with heating.

If necessary, various additives such as pigments, dispersants, antioxidants, UV absorbers, photostabilizers, etc. can be formulated in the cover used in the present invention, in addition to the base material of the heated mixture of the above three kinds of resins.

Further, a golf ball can be obtained by covering the cover on the core. As the core, any of a core for solid golf ball and a core for thread wound golf ball can be used.

The solid core may be a core for a multi-layer golf ball of two or more layers. For example, as the core for a two-piece golf ball, those obtained by subjecting a rubber composition to a press vulcanization to compress with heating (e.g. at 140° to 170° C. for 10 to 40 minutes) into a spherical vulcanized article can be used, said rubber composition being prepared by formulating 10 to 60 parts by weight of at least one vulcanizing agent (crosslinking agent) of α, β-monoethylenically unsaturated carboxylic acids (e.g. acrylic acid, methacrylic acid, etc.) or metal salts thereof and functional monomers (e.g. trimethylolpropane trimethacrylate, etc.), 10 to 30 parts by weight of a filler (e.g. zinc oxide, barium sulfate, etc.), 0.5 to 5 parts by weight of a peroxide (e.g. dicumyl peroxide, etc.) and 0.1 to 1 parts by weight of an antioxidant, based on 100 parts by weight of polybutadiene.

The thread wound core is composed of a center and a thread rubber wound on the center. As the center, any of a liquid center and a rubber center can be used. As the rubber center, there can be used those obtained by vulcanizing the same rubber composition as that of the solid core.

The thread rubber may be those which have hitherto been used. For example, there can be used those obtained by vulcanizing a rubber composition wherein an antioxidant, a vulcanizing accelerator and sulfur are formulated in a natural rubber or a natural rubber and synthetic polyisoprene. The core is not limited to the solid core and thread wound core.

A method of coating the cover on the core is not specifically limited, but may be a normal method. For example, there can be employed a method comprising molding a composition for the cover prepared by formulating a suitable amount of a requisite additive in the specific base material for the cover into a semi-spherical half-shell in advance, covering a core with two half-shells and then subjecting to a pressure molding at 130° to 170° C. for 1 to 5 minutes, or a method comprising subjecting the composition for the cover to an injection molding directly to cover the core. The thickness of the cover is normally about 1 to 3 mm. In case of cover molding, a dimple may be formed on the surface of the ball, if necessary. Further, if necessary, a paint or marking may be provided after cover molding.

As described above, according to the present invention, a golf ball having excellent hit feeling, control properties and flying performance can be obtained.

EXAMPLES

The following Examples and Comparative Examples further illustrate the present invention in detail but are not to be construed to limit the scope thereof.

EXAMPLES 1 TO 7 AND COMPARATIVE EXAMPLES 1 TO 6

(1) Preparation of Core

A thread wound core having an outer diameter of 39.5 mm was prepared by winding a thread rubber comprising a natural rubber/low-cis IR [Shell IR-309 (trade name)] (=50:50) as the base rubber on a liquid center having an outer diameter of 28.1 mm, said liquid center comprising a paste obtained by dispersing barium sulfate in water and a cover rubber of a vulcanized natural rubber having a thickness of 1.7 mm, which covers the paste.

(2) Preparation of Composition for Cover

The formulation components shown in Tables 1 and are mixed by a kneading type twin-screw extruder to prepare a pelletized composition for the cover. The formulations of Preparation Examples 1 to 7 are shown in Table 1 and the formulations of Comparative Preparation Examples 1 to 6 are shown in Table 2. The amount of each component in Tables 1 and 2 is "parts by weight".

The extrusion conditions are as follows: a screw diameter: 45 mm; a screw revolution per minute: 200 rpm; a screw L/D: 35. The formulation components were heated at 220° to 260° C. at the die position of the extruder.

TABLE 1

| | Preparation Example No. | | | | | | |
|---|---|---|---|---|---|---|---|
| | 1 | 2 | 3 | 4 | 5 | 6 | 7 |
| Himilan 1605 *1 | 25 | 30 | 35 | 35 | 30 | 40 | 35 |
| Himilan 1706 *2 | 25 | 30 | 35 | 35 | 30 | 40 | 35 |
| Bondine TX8030 *3 | 49 | — | — | — | — | — | — |
| Bondine HX8140 *4 | — | 39 | — | — | — | — | — |
| Bondine AX8390 *5 | — | — | 29 | 29.5 | 39 | 19 | — |
| Bondine AX8060 *6 | — | — | — | — | — | — | 29 |
| Bondfast 7L *7 | 1.0 | 1.0 | 1.0 | — | 1.0 | 1.0 | 1.0 |
| Bondfast 7M *8 | — | — | — | 0.5 | — | — | — |
| Titanium dioxide | 2.0 | 2.0 | 2.0 | 2.0 | 2.0 | 2.0 | 2.0 |

*1: Trade name, ionomer resin obtained by neutralizing with a sodium ion manufactured by Mitsui Du Pont Polychemical Co., MI (melt index): 2.8, stiffness: about 3,100 kgf/cm$^2$
*2: Trade name, ionomer resin obtained by neutralizing with a zinc ion manufactured by Mitsui Du Pont Polychemical Co., MI: 0.7, stiffness: about 2,600 kgf/cm$^2$
*3: Trade name, ethylene-ethyl acrylate-maleic anhydride terpolymer manufactured by Sumitomo Chemical Co., Ltd., MI: 3.0, stiffness: about 500 kgf/cm$^2$, amount of ethyl acrylate and maleic anhydride: 15% (amount of maleic anhydride: 1 to 4%)
*4: Trade name, ethylene-ethyl acrylate-maleic anhydride terpolymer manufactured by Sumitomo Chemical Co., Ltd., MI: 20, stiffness: about 300 kgf/cm$^2$, amount of ethyl acrylate and maleic anhydride: 22% (amount of maleic anhydride: 1 to 4%)
*5: Trade name, ethylene-ethyl acrylate-maleic anhydride terpolymer manufactured by Sumitomo Chemical Co., Ltd., MI: 7.0, stiffness: <100 kgf/cm$^2$, amount of ethyl acrylate and maleic anhydride: 32% (amount of maleic anhydride: 1 to 4%)
*6: Trade name, ethylene-ethyl acrylate-maleic anhydride terpolymer manufactured by Sumitomo Chemical Co., Ltd., MI: 40, stiffness: <100 kgf/cm$^2$, amount of ethyl acrylate and maleic anhydride: 31% (amount of maleic anhydride: 1 to 4%)
*7: Trade name, ethylene-glycidyl methacrylate-methyl acrylate terpolymer manufactured by Sumitomo Chemical Co., Ltd., MI: 9, stiffness: 60 kgf/cm$^2$, copolymerization ratio: ethylene/glycidyl methacrylate/methyl acrylate = 67/3/30 (weight ratio)
*8: Trade name, ethylene-glycidyl methacrylate-methyl acrylate terpolymer manufactured by Sumitomo Chemical Co., Ltd., MI: 9, stiffness: 40 kgf/cm$^2$, copolymerization ratio: ethylene/glycidyl methacrylate/methyl acrylate = 64/6/30 (weight ratio)

TABLE 2

| | Comparative Preparation Example No. | | | | | |
|---|---|---|---|---|---|---|
| | 1 | 2 | 3 | 4 | 5 | 6 |
| Himilan 1605 | 25 | 35 | 30 | 40 | 50 | 25 |
| Himilan 1706 | 25 | 35 | 30 | 40 | 50 | 25 |
| Bondine TX8030 | 50 | — | — | — | — | — |
| Bondine AX8390 | — | 30 | 40 | 20 | — | — |
| Himilan AD8269 *9 | — | — | — | — | — | 50 |
| Titanium dioxide | 2.0 | 2.0 | 2.0 | 2.0 | 2.0 | 2.0 |

*9: Trade name, soft ionomer resin of ethylene-methacrylic acid-acrylate terpolymer manufactured by Mitsui Du Pont Polychemical Co., MI: 1.2, stiffness: about 300 kgf/cm$^2$ (3) Production of Golf Ball A thread wound golf ball was obtained by molding a semi-spherical half-shell from the cover composition of the above item (2), covering the core of the item (1) with two half-shells and then subjecting to a press molding in a die for the golf ball. The thread wound golf ball was coated with a paint to give a coated golf ball of 42.8 mm in diameter.

The ball weight, the ball compression, the ball initial velocity and the flying distance of the golf ball thus obtained were measured. The ball compression was measured by PGA method, and the ball initial velocity was measured by R & A initial velocity measuring method. The flying distance was measured by hitting with a No. 1 wood club at a head speed of 45 m/second, using a swing robot manufactured by True Temper Co.

Further, the hit feeling and the control properties of the resulting golf ball were evaluated by 10 top professional golfers according to a practical hitting test. The evaluation criteria are as follows. The results shown in the Tables below are based on the fact that not less than 8 out of 10 professional golfers evaluated with the same criterion about each test item.

Hit Feeling o: Good, namely, impact strength is small, soft and light feeling x: Inferior Control Properties o: Good, namely, it is easy to put iron-spin on the ball and the ball can be easily stopped x: Inferior In Table 3, the ball weight, the ball compression, the ball initial velocity, the flying distance, the hit feeling and the control properties of the golf balls of Examples 1 to 7, and the kind of the composition for the cover used in the production of the golf ball are shown. In Table 4, the ball weight, the ball compression, the ball initial velocity, the flying distance, the hit feeling and the control properties of the golf balls of Comparative Examples 1 to 6, and the kind of the composition for the cover used in the production of the golf ball are shown. The kind of the composition for the cover is shown by Preparation Example No. or Comparative Preparation Example No. The golf ball of Comparative Example 5 is a golf ball wherein only an ionomer resin was used as the resin component of the cover, and is a golf ball for a criterion of comparison.

TABLE 3

| | Example No. | | | | | | |
|---|---|---|---|---|---|---|---|
| | 1 | 2 | 3 | 4 | 5 | 6 | 7 |
| Composition for cover (Preparation Example) | No. 1 | No. 2 | No. 3 | No. 4 | No. 5 | No. 6 | No. 7 |
| Ball weight (g) | 45.3 | 45.3 | 45.4 | 45.4 | 45.4 | 45.3 | 45.3 |
| Ball compression | 85 | 85 | 85 | 85 | 83 | 87 | 85 |
| Ball initial velocity (feet/second) | 252.7 | 252.8 | 252.8 | 252.8 | 252.6 | 253.0 | 252.7 |
| Flying distance (yard) | 227 | 228 | 228 | 228 | 227 | 228 | 227 |
| Hit feeling | ○ | ○ | ○ | ○ | ○ | ○ | ○ |
| Control properties | ○ | ○ | ○ | ○ | ○ | ○ | ○ |

TABLE 4

| | Comparative Example No. | | | | | |
|---|---|---|---|---|---|---|
| | 1 | 2 | 3 | 4 | 5 | 6 |
| Composition for cover (Comparative Preparation Example) | No. 1 | No. 2 | No. 3 | No. 4 | No. 5 | No. 6 |
| Ball weight (g) | 45.3 | 45.4 | 45.4 | 45.3 | 45.2 | 45.2 |
| Ball compression | 84 | 84 | 82 | 86 | 95 | 85 |
| Ball initial velocity (feet/second) | 251.0 | 251.0 | 250.5 | 251.5 | 253.0 | 251.0 |
| Flying distance (yard) | 223 | 223 | 222 | 223 | 229 | 223 |
| Hit feeling | ○ | ○ | ○ | ○ | x | ○ |
| Control properties | ○ | ○ | ○ | ○ | x | ○ |

As is apparent from the results shown in Tables 3 and 4, the golf balls of Examples 1 to 7 attained the flying distance of 227 to 229 yards, which is almost the same as that of the golf ball of Comparative Example 5 wherein only the ionomer resin was used as the base resin for the cover, and the golf balls of Examples 1 to 7 were superior in flying distance. Further, the golf balls of Examples 1 to 7 were superior in hit feeling and control properties.

On the other hand, the golf balls of Comparative Examples 1 to 4 and 6 were 4 to 6 yards inferior in flying distance in comparison with the golf balls of Examples 1 to 7. That is, the golf balls of Comparative Examples 1 to 4 wherein Bondfast as the glycidyl group-containing olefinic copolymer is not formulated were superior in hit feeling and control properties, but the flying performance was insufficient. Further, the golf ball of the Comparative Example 6 wherein the soft ionomer resin is formulated was also superior in hit feeling and control properties, but the flying performance was insufficient.

The evaluation results of the practical hitting test by professional golfers will be explained in detail as follows.

The golf balls of the Examples 1 to 7 had the hit feeling and control properties which are almost the same as those of the thread wound golf ball coated with the cover mainly composed of transpolyisoprene (balata). The flying distance attained to a satisfactory level.

On the contrary, the golf ball of the Comparative Example 5 wherein only the ionomer resin is used as the base resin for the cover had hard hit feeling and inferior control properties because it is hard to put spin on the ball. The golf ball of the Comparative Examples 1 to 4 and 6 were superior in hit feeling and control properties, but the flying distance was inferior.

Furthermore, in order to examine the cut resistance of the golf balls of the Examples 1 to 7 and Comparative Examples 1 to 6, the top part of the golf ball was hit at a head speed of 30 m/second using a swing robot mounted with a pitching wedge manufactured by True Temper Co. to examine whether a cut mark is arisen or not.

As a result, no cut mark was arisen in the golf balls of the Examples 1 to 7 and the Comparative Example 5, but a small cut mark was arisen in the golf balls of the Comparative Examples 1 to 4 and 6.

Regarding the thread wound golf ball coated with the cover mainly composed of transpolyisoprene (balata), the cut resistance was examined under the same conditions. As a result, a large cut mark which can not stand use was arisen in the thread wound golf ball.

EXAMPLES 8 TO 10 AND COMPARATIVE EXAMPLES 7 TO 10

(1) Preparation of Core

A rubber composition prepared by formulating 36 parts by weight of zinc acrylate, 20 parts by weight of zinc oxide, 1.2 parts by weight of dicumyl peroxide and 0.5 parts by weight of an antioxidant [Yoshinox 425 (trade name), manufactured by Yoshitomi Pharmaceutical Industries Ltd.] in 100 parts by weight of a polybutadiene rubber [BR-11 (trade name), manufactured by Japan Synthetic Rubber Co., Ltd] was subjected to a vulcanization molding at 160° C. for 25 minutes to give a solid core. The average diameter of the solid core thus obtained was 38.2 mm.

(2) Preparation of Composition for Cover

The compositions for the cover shown in Tables 5 and 6 were prepared. The preparation method is the same as that used in Examples 1 to 7. In Table 5, the formulations of the Preparation Examples 8 to 10 are shown. In Table 6, the formulations of the Comparative Preparation Examples 7 to 10 are shown. Further, the amount of each component in Tables 5 and 6 is "parts by weight".

TABLE 5

| | Preparation Example No. | | |
|---|---|---|---|
| | 8 | 9 | 10 |
| Himilan 1605 | 35 | 35 | 40 |
| Himilan 1706 | 35 | 35 | 40 |
| Bondine AX8390 | 29 | 29.5 | 19 |
| Bondfast 7L | 1.0 | — | 1.0 |
| Bondfast 7M | — | 0.5 | — |
| Himilan AD8269 | — | — | — |
| Titanium dioxide | 1.0 | 1.0 | 1.0 |

TABLE 6

| | Comparative Preparation Example No. | | | |
|---|---|---|---|---|
| | 7 | 8 | 9 | 10 |
| Himilan 1605 | 35 | 40 | 50 | 25 |
| Himilan 1706 | 35 | 40 | 50 | 25 |
| Bondine AX8390 | 30 | 20 | — | — |

TABLE 6-continued

|  | Comparative Preparation Example No. | | | |
| --- | --- | --- | --- | --- |
|  | 7 | 8 | 9 | 10 |
| Bondfast 7L | — | — | — | — |
| Bondfast 7M | — | — | — | — |
| Himilan AD8269 | — | — | — | 50 |
| Titanium dioxide | 1.0 | 1.0 | 1.0 | 1.0 |

(3) Production of Golf Ball

The composition for the cover obtained in the above item (2) was coated on the solid core obtained in the above item (1) by an injection molding to give a coated golf ball of 42.8 mm in diameter.

The ball weight, the ball compression, the ball initial velocity and the flying distance of the golf ball thus obtained were measured and, further, the hit feeling and the control properties were examined.

In Table 7, the ball weight, the ball compression, the ball initial velocity, the flying distance, the hit feeling and the control properties of the golf balls of Examples 8 to 10, and the kind of the composition for the cover used in the production of the golf ball are shown. In Table 8, the ball weight, the ball compression, the ball initial velocity, the flying distance, the hit feeling and the control properties of the golf balls of Comparative Examples 7 to 10, and the kind of the composition for the cover used in the production of the golf ball are shown. The kind of the composition for the cover is shown by Preparation Example No. or Comparative Preparation Example No. The golf ball of Comparative Example 9 is a golf ball wherein only the ionomer resin was used as the resin component of the cover, and is a golf ball for a criterion of comparison. Further, the measuring methods of various physical properties and the evaluation methods of the hit feeling and the control properties are the same as those used in the Examples 1 to 7.

TABLE 7

|  | Example No. | | |
| --- | --- | --- | --- |
|  | 8 | 9 | 10 |
| Composition for cover (Preparation Example) | No. 8 | No. 9 | No. 10 |
| Ball weight (g) | 45.4 | 45.4 | 45.3 |
| Ball compression | 90 | 90 | 93 |
| Ball initial velocity (feet/second) | 252.9 | 252.9 | 253.0 |
| Flying distance (yard) | 228 | 228 | 229 |
| Hit feeling | o | o | o |
| Control properties | o | o | o |

TABLE 8

|  | Comparative Example No. | | | |
| --- | --- | --- | --- | --- |
|  | 7 | 8 | 9 | 10 |
| Composition for cover (Comparative Preparation Example) | No.7 | No.8 | No.9 | No.10 |
| Ball weight (g) | 45.4 | 45.4 | 45.3 | 45.3 |
| Ball compression | 89 | 92 | 105 | 90 |
| Ball initial velocity (feet/second) | 251.0 | 251.5 | 253.2 | 251.0 |
| Flying distance (yard) | 223 | 224 | 230 | 223 |
| Hit feeling | o | o | x | o |
| Control properties | o | o | x | o |

As is apparent from the results shown in Tables 7 and 8, the golf balls of the Examples 8 to 10 were superior in hit feeling, control properties and flying performance, similar to the thread wound golf balls of the Examples 1 to 7.

That is, the golf balls of Examples 8 to 10 attained the flying distance of 228 to 229 yards, which is almost the same as that of the golf ball of Comparative Example 9 wherein only the ionomer resin was used as the base resin for the cover, and the golf balls of Examples 8 to 10 were superior in flying distance. Further, the golf balls of Examples 8 to 10 were superior in hit feeling and control properties.

Regarding the golf balls of the Examples of 8 to 10, the cut resistance was examined, similar to the Examples 1 to 7. As a result, no cut mark was arisen and the golf balls of the Examples of 8 to 10 were superior in cut resistance.

On the other hand, the golf ball of Comparative Example 9 was superior in flying performance and cut resistance, but the hit feeling and the control properties were inferior. The golf balls of the Comparative Examples 7 to 8 and 10 were superior in hit feeling and control properties, but the flying distance was 4 to 6 yards inferior in comparison with the golf balls of the Examples 8 to 10.

What is claimed is:

1. A golf ball having a core and a cover covering the core, a base material of said cover comprising a heated mixture of 30 to 85% by weight of an ionomer resin, 10 to 69.8% by weight of a maleic anhydride-modified olefin copolymer, and 0.2 to 5% by weight of a glycidyl group-containing olefin copolymer, said ionomer resin comprising a copolymer of an olefin and an unsaturated carboxylic acid partially neutralized with a metal ion.

2. The golf ball according to claim 1, wherein the maleic anhydride-modified olefinic copolymer is an ethylene-acrylate-maleic anhydride terpolymer.

3. The golf ball according to claim 1, wherein the glycidyl group-containing olefinic copolymer is an ethylene-glycidyl methacrylate copolymer, an ethylene-glycidyl methacrylate-acrylate terpolymer or an ethylene-glycidyl methacrylate-vinyl acetate terpolymer.

4. The golf ball according to claim 1, wherein the stiffness of the maleic anhydride-modified olefin copolymer is about 10 to 1,000 kgf/cm$^2$.

* * * * *